US008991849B2

(12) United States Patent
Derks et al.

(10) Patent No.: US 8,991,849 B2
(45) Date of Patent: Mar. 31, 2015

(54) SLIDING ARM MECHANISM FOR WHEELCHAIRS

(75) Inventors: Richard P. Derks, Hawthorn Woods, IL (US); Brian Ramirez, Chicago, IL (US); Corbett Brown, Jr., Round Lake Park, IL (US)

(73) Assignee: Medline Industries, Inc., Mundelein, IL (US)

( * ) Notice: Subject to any disclaimer, the term of this patent is extended or adjusted under 35 U.S.C. 154(b) by 483 days.

(21) Appl. No.: 13/253,622

(22) Filed: Oct. 5, 2011

(65) Prior Publication Data

US 2012/0086184 A1 Apr. 12, 2012

Related U.S. Application Data

(60) Provisional application No. 61/390,315, filed on Oct. 6, 2010.

(51) Int. Cl.
*A61G 5/12* (2006.01)
*B23P 17/04* (2006.01)
*A61G 5/00* (2006.01)

(52) U.S. Cl.
CPC ............ *A61G 5/12* (2013.01); *A61G 2005/125* (2013.01)
USPC ...................... 280/304.1; 297/411.35; 29/428

(58) Field of Classification Search
CPC ........................................................ A61G 5/12
USPC ............... 280/304.1, 304, 304.5; 297/411.35, 297/411.37, 411.3; 29/428
See application file for complete search history.

(56) References Cited

U.S. PATENT DOCUMENTS

| | | | | |
|---|---|---|---|---|
| 5,415,459 | A * | 5/1995 | Schultz | 297/411.37 |
| 5,997,021 | A * | 12/1999 | Robinson et al. | 280/250.1 |
| 6,220,616 | B1 * | 4/2001 | Finch | 280/304.1 |
| 6,290,300 | B1 | 9/2001 | Sutton et al. | 297/411.37 |
| 7,500,689 | B2 * | 3/2009 | Pasternak et al. | 280/304.1 |
| 2003/0030317 | A1 * | 2/2003 | Chen | 297/411.35 |

OTHER PUBLICATIONS

Medline Industries, Inc. Excel® Wheelchairs Brochure, Mar. 2010 (32 pages).
Boss Leather Task Chair With Adjustable Arms, http://www.officefurnituretoday.com/Boss_Leather_Task_Chair_p/bos-b1561.htm, date estimated as early as Jul. 6, 2010 (1 page).
Wheelchair Arm Support, Level or Elevated Brochure, www.RehabMart.com, date estimated as early as Jul. 6, 2010 (2 pages).
Photographs of Haworth X99 Task Chair With 3-Dimensional Arms (Figs. 1-9), Aug. 5, 2010 (9 pages).

* cited by examiner

*Primary Examiner* — Joseph Rocca
*Assistant Examiner* — Jacob Knutson
(74) *Attorney, Agent, or Firm* — Nixon Peabody LLP

(57) ABSTRACT

A sliding arm mechanism for attaching to an arm of a wheelchair is provided herein. One concept is directed to a sliding arm mechanism that includes a main portion and an inner cavity. The sliding arm mechanism also includes a slide rail, which is adapted to be housed within the inner cavity of the main portion. The slide rail and the main portion are slidably coupled to allow the main portion to move laterally over the slide rail in a direction parallel to the top part of the arm of the wheelchair, thus allowing the main portion to move between a first position and a second position. In some embodiments, the first position corresponds to a full-length position and the second position corresponds to a desk-length position, such that a user can adjust the sliding arm mechanism to access a desk or table.

8 Claims, 9 Drawing Sheets

SLIDING ARM MECHANISM FOR WHEELCHAIRS

CROSS REFERENCE TO RELATED APPLICATION

This application claims the benefit of priority of U.S. Provisional Application No. 61/390,315, filed Oct. 6, 2010, which is hereby incorporated by reference in its entirety.

FIELD OF THE INVENTION

This invention is directed generally to wheelchairs, and more particularly, to a sliding arm mechanism for wheelchairs.

BACKGROUND OF THE INVENTION

Wheelchairs generally offer a device for individuals to move from one area to another area when they are injured, sick or are otherwise incapable of walking themselves. In some situations, such individuals, particularly those in nursing homes, may spend a large part of their days in wheelchairs. In these circumstances, it is often important from a therapeutic standpoint to provide comfort and support while these individuals are in the wheelchair for extended periods of time. To avoid fatigue, numbness, and general discomfort, wheelchairs are designed to provide comfort and support to an individual's lower body, back and upper body parts, such as the arms. In particular, for proper arm support and comfort, it is important to provide appropriately positioned arm rests attached to the wheelchairs.

It is also important that arm rests provide good stability as the arm rests are often used by individuals to maneuver into and out of the wheelchairs. Individuals often put a large amount of their weight onto the arm rests when positioning themselves and, therefore, the arm rests must be sturdy enough to support an individual's weight. In fact, in some circumstances, therapists may even use the arm rests on wheelchairs as a tool for helping individuals to exercise their arms and to gain strength in their upper bodies. Thus, for these reasons, it is necessary that the arm rests are able to remain in a fixed position and are strong enough to support an individual's weight.

Maximum support and stability is provided by wheelchairs having an arm rest in a full-length position. This position provides support for the lower forearm, generally from the elbow to the wrist area, with the hands of the individuals being able to hang down from the end of the arm rest in a natural, resting position. While there is no specific industry standard, for most wheelchairs that are commercially available, the length of the arm rest in a full-length wheelchair is generally about 13-14 inches in length. The arm rest is generally located about 2-3 inches from the front of the wheelchair, such that the arm rest is not flush with the front of the wheelchair. Instead, the arm rest is positioned a short distance from the front of the wheelchair to provide a comfortable, natural position for a user's arms. This full-length position provides the most comfort and support for a user when the user is in a natural sitting position in the wheelchair.

However, the full-length position offers some disadvantages when it comes to being able to access certain items that are typically used by people on a day-to-day basis. For example, when a wheelchair user wishes to use a desk or table, it is often the case that the arms of the wheelchair make it impossible for the user to get close enough to the table to eat, write, work, etc. at the desk or table. Thus, the arms of the wheelchair in the full-length position sometimes create obstacles for wheelchair users. Wheelchair users typically find themselves having to arrange their wheelchairs in a less than desirable or comfortable orientation to position themselves to be able to access the desk or table. In other scenarios, wheelchair users are often forced to adapt to finding a different way to eat, write, work, etc. altogether than at a desk or table. This makes what should be a somewhat routine activity a much more troublesome undertaking.

To make such access to desks and tables easier, wheelchair makers offer a variation on the full-length position, specifically known as a desk-length arm rest. With these "desk length" wheelchairs, the length of the arm rest is generally about 9-10 inches—or about 4-5 inches shorter than the full-length arm rests. Additionally, the arm rest in a desk-length wheelchair is generally located about 6-7 inches from the front of the wheelchair, such that the arm rest is about an additional 4 inches back from the full-length position. This allows a user of the wheelchair to access a desk or table when the wheelchair has desk-length arm rests.

In some embodiments, the arms on both the full-length and desk-length wheelchairs may be permanently attached or may be removable. Wheelchairs having permanent arms may have the arms welded in place. Alternatively, removable wheelchair arms can be removed and transferred to different wheelchairs. For example, for a wheelchair having an arm with a full-length arm rest, the arm may be removed and substituted with an arm having a desk-length arm rest. The removable arms include mechanisms for connecting and releasing the arms in the wheelchair, typically by sliding the vertical tube members of the arms into locking elements in the wheelchair. In some wheelchair models, the arms may be capable of being flipped or swung back to a position that allows a user to easily transfer on and off the seat of the wheelchair. These "swing back," or "flip back," wheelchairs include a flip back arm release that releases the arms and allows the arms to swing back toward the back portion of the wheelchair and, once a user has been seated, then swings forward again to reconnect to the wheelchair. In these flip-back models, the arms may also be permanent or removable, and may have either full-length or desk-length arm rests.

Thus, to accommodate individuals who use wheelchairs having full-length arm rests and wheelchairs having desk-length arm rests, hospitals, nursing homes and other healthcare facilities must purchase and store both types of wheelchairs, or at least both types of wheelchair arms. This increases the cost and space needed for purchasing and storing both types of wheelchairs and/or wheelchair arms. Additionally, healthcare personnel must spend time moving individuals from one wheelchair type to another, or removing and transferring wheelchair arms from one wheelchair to another. In order to reduce the inventory needed to accommodate users of both types of wheelchairs and to reduce the personnel time needed to move individuals from one type of wheelchair to another (or arms from one wheelchair to another), it would be desirable to have a single wheelchair having an arm rest that could be adjusted based on a particular user's needs.

In particular, it would be desirable to provide users with the flexibility and convenience of providing a wheelchair that has arm rests that may easily be adjusted between full-length and desk-length positions (and vice versa). This would eliminate the need to move individuals, or wheelchair arms, from one type of wheelchair to another, a maneuver that may be inconvenient (if not very difficult) for some individuals. It also allows individuals who regularly use wheelchairs to avoid having to make daily decisions as to whether to play cards, eat, write, etc. based on whether they wish to go through the difficulty of having to move to another type of wheelchair—a task that becomes more difficult the older or infirm an individual becomes. Providing a single wheelchair having adjustable arm rests offers individuals who use wheelchairs more independence and personal dignity when deciding how, when and where to conduct their daily activities. This also provides doctors, therapists and other healthcare workers with more options when deciding whether and what type of wheelchair to recommend to their patients, as current wheelchairs are either of the full-length position or desk-length position (but not both).

Therefore, a need exists to provide improved wheelchair devices for addressing the above-mentioned issues.

BRIEF DESCRIPTION OF THE DRAWINGS

Various advantages of the invention will become apparent upon reading the following detailed description and upon reference to the drawings.

Figure 1B:
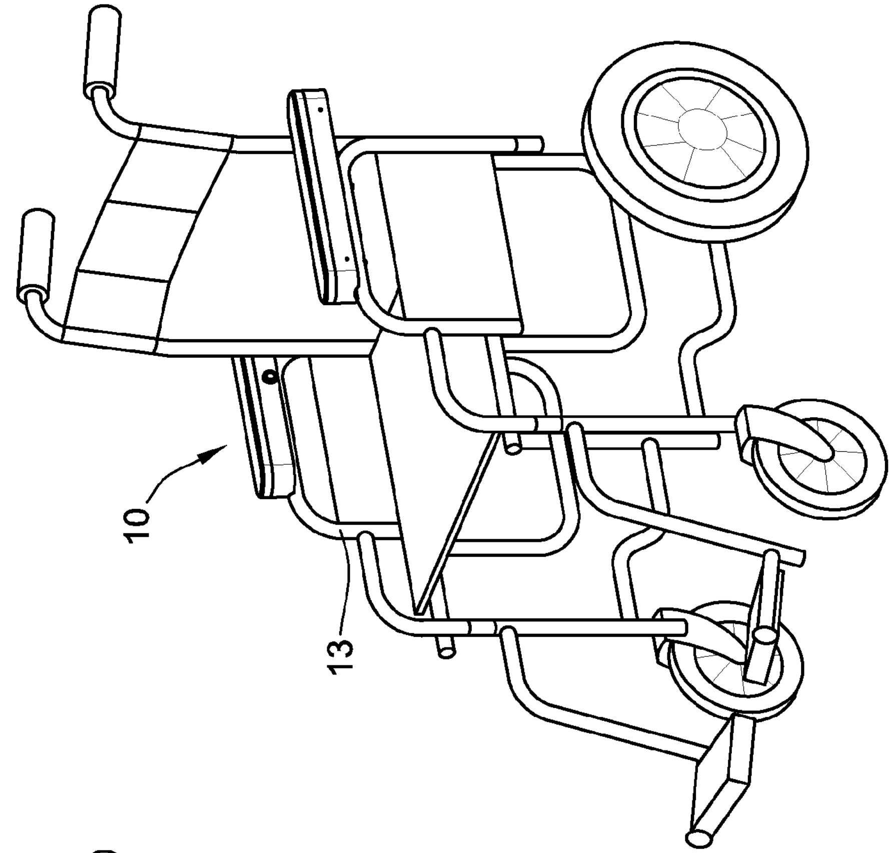
FIG. 1B is a perspective view of a wheelchair having a sliding arm mechanism according to another embodiment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention.

DETAILED DESCRIPTION OF THE ILLUSTRATED EMBODIMENTS

While this invention is susceptible of embodiment in many different forms, there are shown in the drawings and will herein be described in detail representative embodiments of the invention with the understanding that the present disclosure is to be considered as an exemplification of the principles of the invention and is not intended to limit the broad aspect of the invention to the embodiments illustrated. To that extent, elements and limitations that are disclosed, for example, in the Figures, Abstract, and Detailed Description of the Illustrative Embodiments, but not explicitly set forth in the claims, should not be incorporated into the claims, singly or collectively, by implication, inference or otherwise.

Referring to the drawings, wherein like reference numbers refer to like components throughout the several views, FIG. 1 presents an illustration of an exemplary wheelchair with a sliding arm mechanism, designated generally as 10, in accordance with various aspects of the present disclosure. The drawings presented herein are not necessarily to scale, and are provided purely for explanatory purposes. Thus, the individual and relative dimensions and orientations shown in the drawings are not to be considered limiting. In addition, the use of spatial adjectives in the specification and claims, such as “front,” “rear,” “forward,” “rearward,” “upward,” “downward,” etc., are intended, unless explicitly indicated otherwise, to specify the comparative orientation of a given component relative to the wheelchair.

Figure 1A:
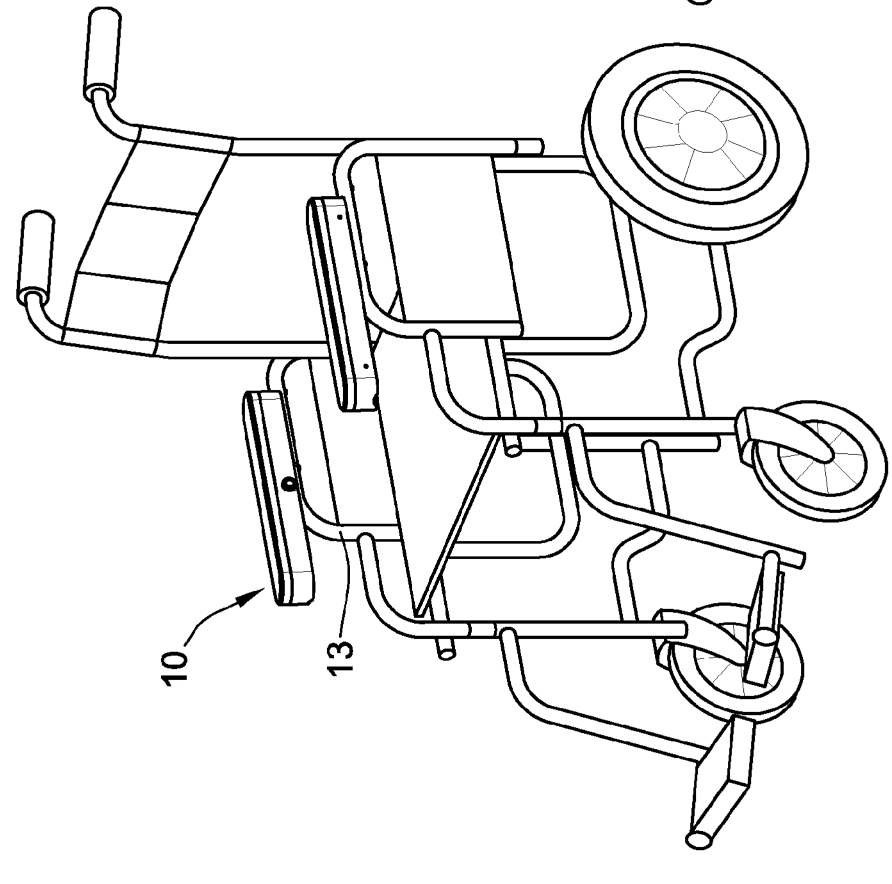
FIG. 1A is a perspective view of a wheelchair having a sliding arm mechanism according to one embodiment.

According to one embodiment shown in FIG. 1A, a wheelchair having a sliding arm mechanism 10 is shown. The sliding arm mechanism 10 is attached to an arm 13 of the wheelchair. Once a user is sitting in the wheelchair, the sliding arm mechanism 10 is adapted to receive a portion of the user’s lower arm, or forearm. In this particular embodiment, the sliding arm mechanism 10 is shown in a full-length position to support a user’s arm extending from at least the elbow of the user’s arm to the wrist/hand area, wherein all or a portion of the user’s hand may extend down in a natural, hanging position. In another embodiment shown in FIG. 1B, the sliding arm mechanism 10 is shown in a desk-length position. In the desk-length position, the sliding arm mechanism 10 provides support for less than the full length of a user’s lower arm, for example, extending from a user’s elbow to a distance about ⅓ to about ½ of a user’s lower arm. The full-length and the desk-length positions are described in more detail below.

Figure 2:
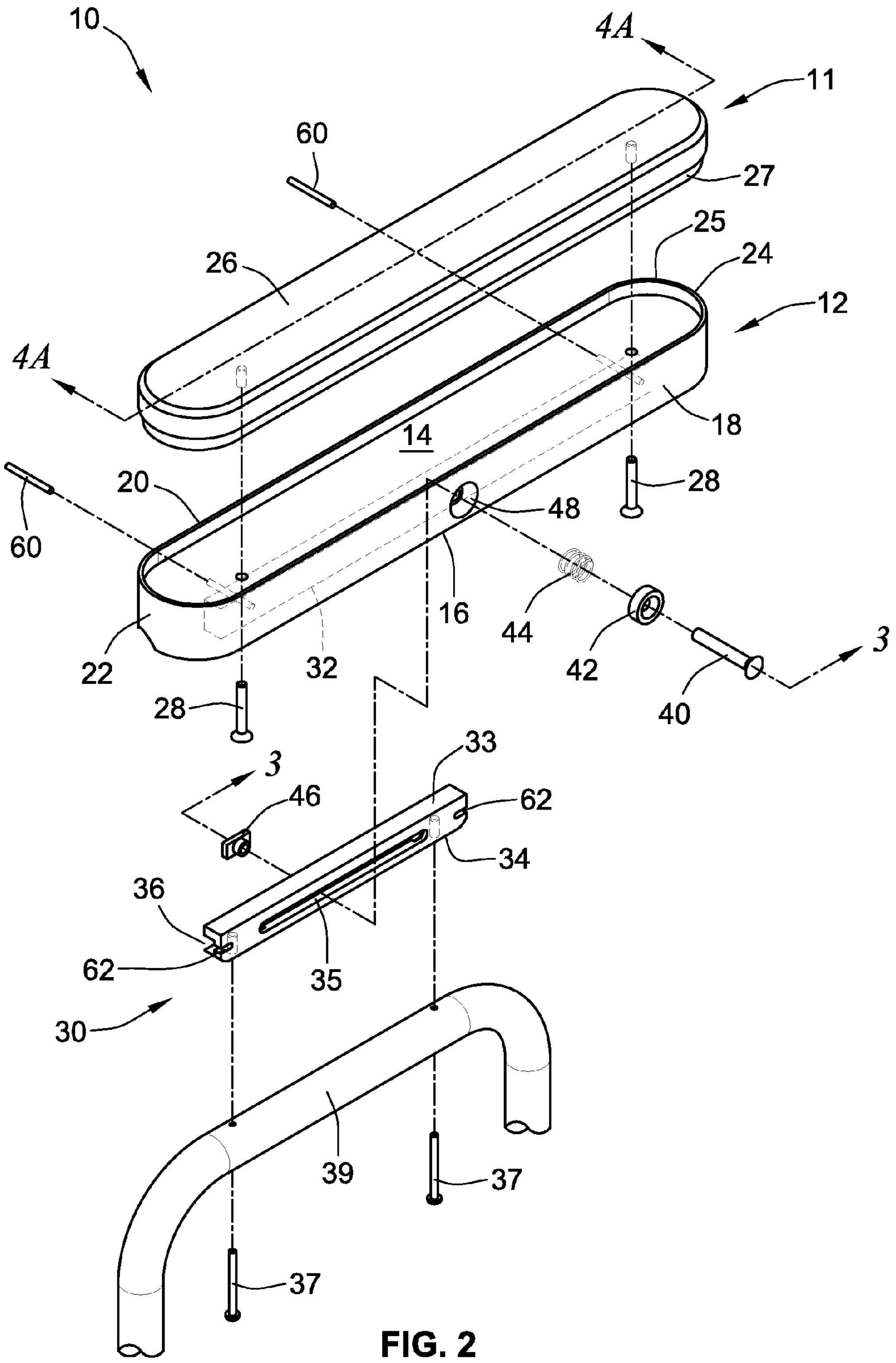
FIG. 2 is an expanded view of the sliding arm mechanism according to one embodiment.

Turning to FIG. 2, an expanded view of the sliding arm mechanism 10 is shown. The sliding arm mechanism 10 includes a main portion 12. The main portion 12 may be comprised of a plastic material, such as polyvinyl chloride (PVC) or polyurethane (PU), or other rigid plastic material. The main portion 12 includes a top area 14 and a bottom area 16, as well as first and second opposing side areas 18, 20 and first and second opposing end areas 22, 24. As discussed in more detail below, the main portion 12 includes an inner cavity 32 which is accessible via the bottom area 16. In one embodiment, the main portion 12 may be rectangular with rounded corners connecting the first and second opposing side areas 18, 20 and the first and second opposing end areas 22, 24, or may include other shapes which are desirable for accommodating a user’s lower arm, or forearm.

The top area 14 may include a raised outer rim 25, around the perimeter of the top area 14, which is adapted for receiving an arm pad 11. The arm pad 11 may include an arm pad cover 26 and a support 27 for attaching to the top area 14 of the main portion 12. The arm pad 11, including the arm pad cover 26 and the support 27, may be attached to the top area 14 of the main portion 12 via one or more screws 28, or via other means of attachment, such as by adhesives, rivets or other suitable means. The arm pad cover 26 may be comprised of any material that provides a comfortable surface for receiving a user’s arm, such as vinyl or nylon upholstery.

Figure 4A:
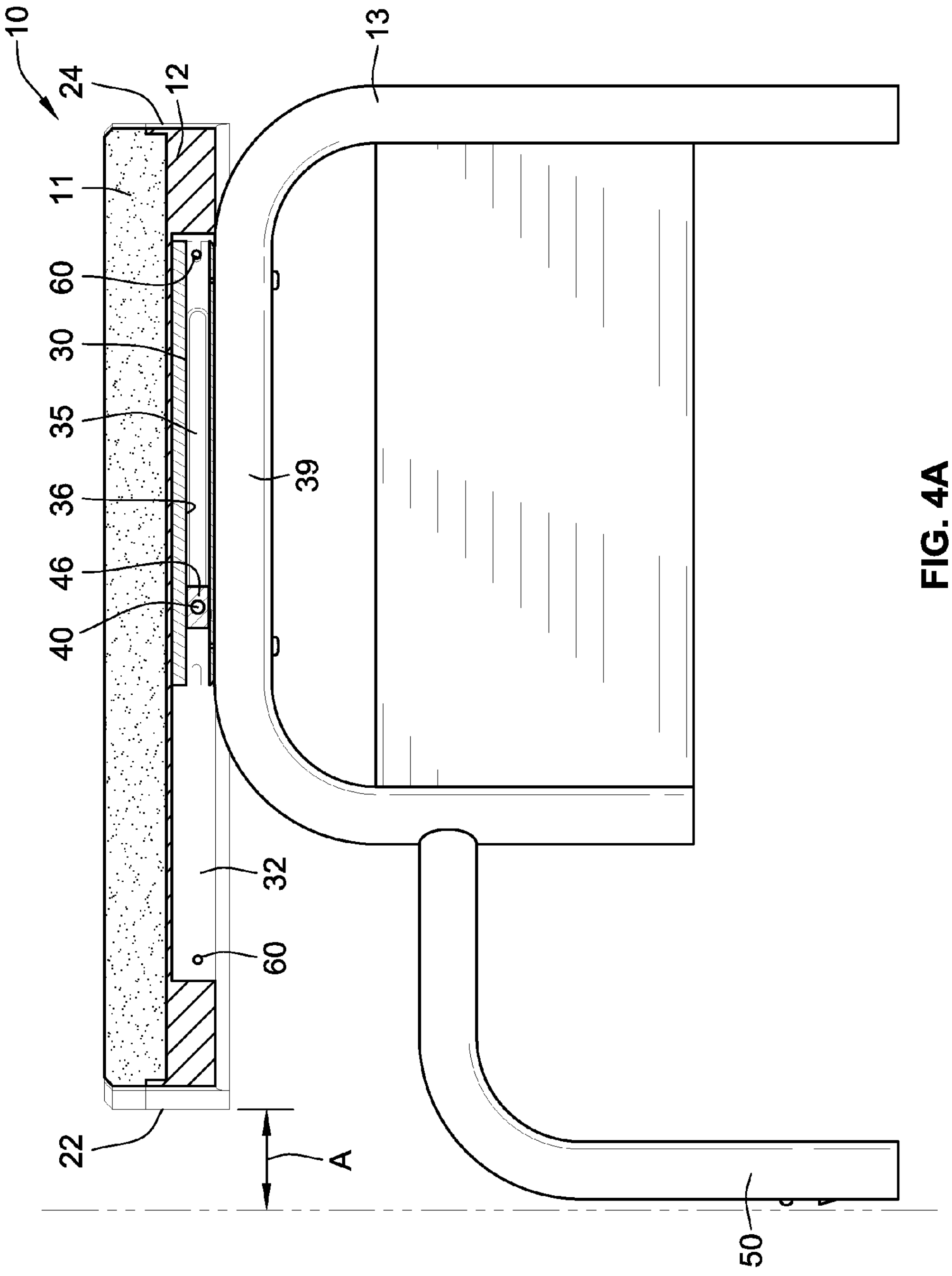
FIG. 4A is a cross-sectional view of the sliding arm mechanism attached to an arm of a wheelchair in a full-length position according to one embodiment.
Figure 4B:
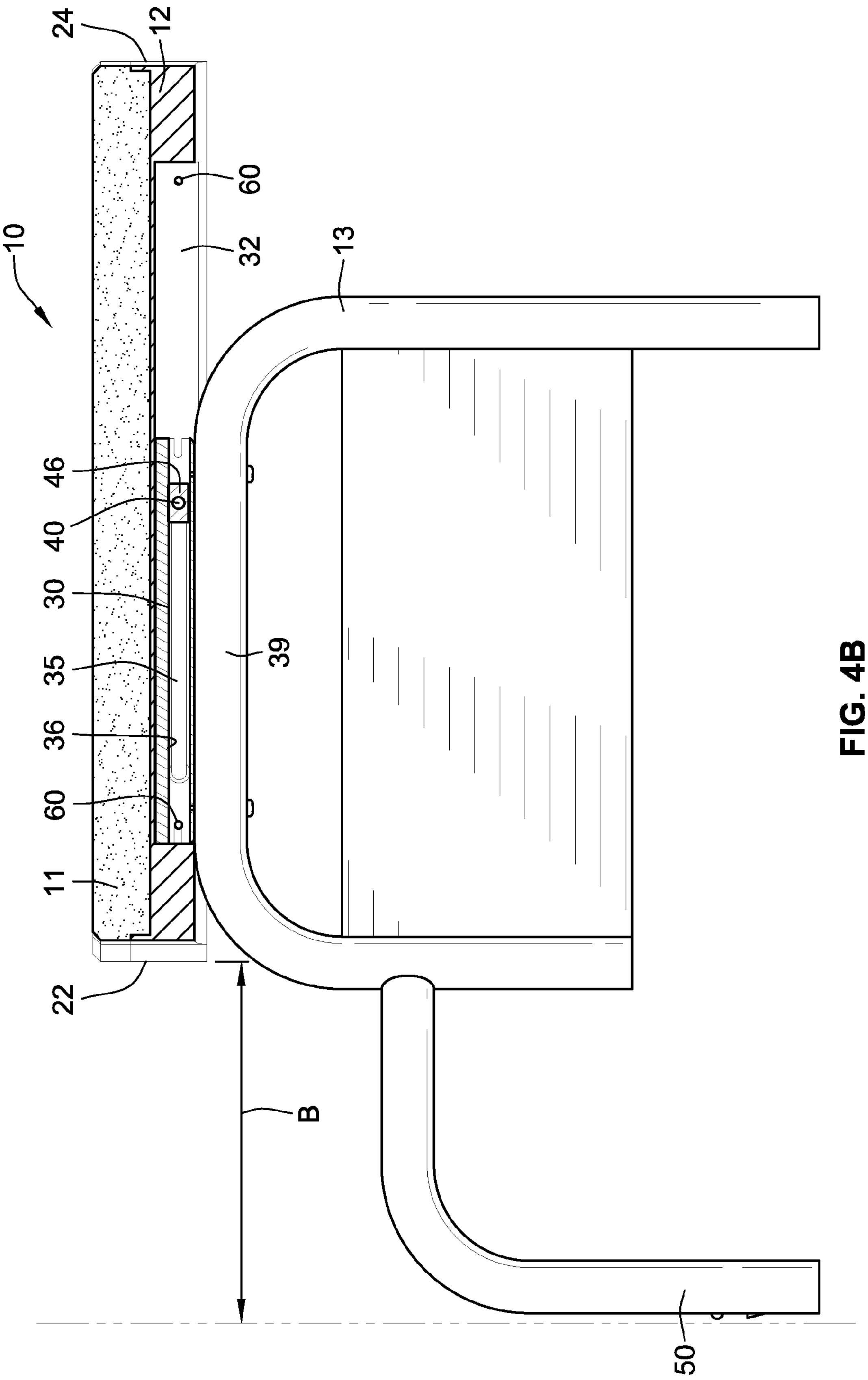
FIG. 4B is a perspective view of the sliding arm mechanism attached to an arm of a wheelchair in a desk-length position according to another embodiment.

According to the embodiment shown in FIG. 2, a slide rail 30 is adapted to be housed within the inner cavity 32 of the main portion 12. The inner cavity 32 of the main portion 12 includes an elongated open area for receiving the slide rail 30. The slide rail 30 includes a top side 33, a bottom side 34 and a generally elongated aperture 35. The slide rail 30 may also include a track 36 (shown in more detail in FIG. 5). The slide rail 30 is removably coupled to a top part 39 of an arm of a wheelchair via any suitable coupling means, such as a screw 37, adhesives, rivets or other suitable means of attachment. Alternatively the slide rail 30 may be permanently mounted to the top part 39 of an arm of a wheelchair. The slide rail 30 may be comprised of steel, aluminum, or any other suitable material. In some embodiments, the entire arm of the wheelchair (as shown in FIGS. 4A and 4B), including the sliding arm mechanism 10, may be removable, such that it can be transferred and attached to other wheelchairs. This allows any existing wheelchair model to be equipped with an arm having the sliding arm mechanism 10 described herein. Additionally, the sliding arm mechanism 10 itself may be attachable to an arm of an existing wheelchair via any suitable type of attaching means, thus allowing the sliding arm mechanism 10 to be removed and transferred from one wheelchair to another when needed.

Figure 3:
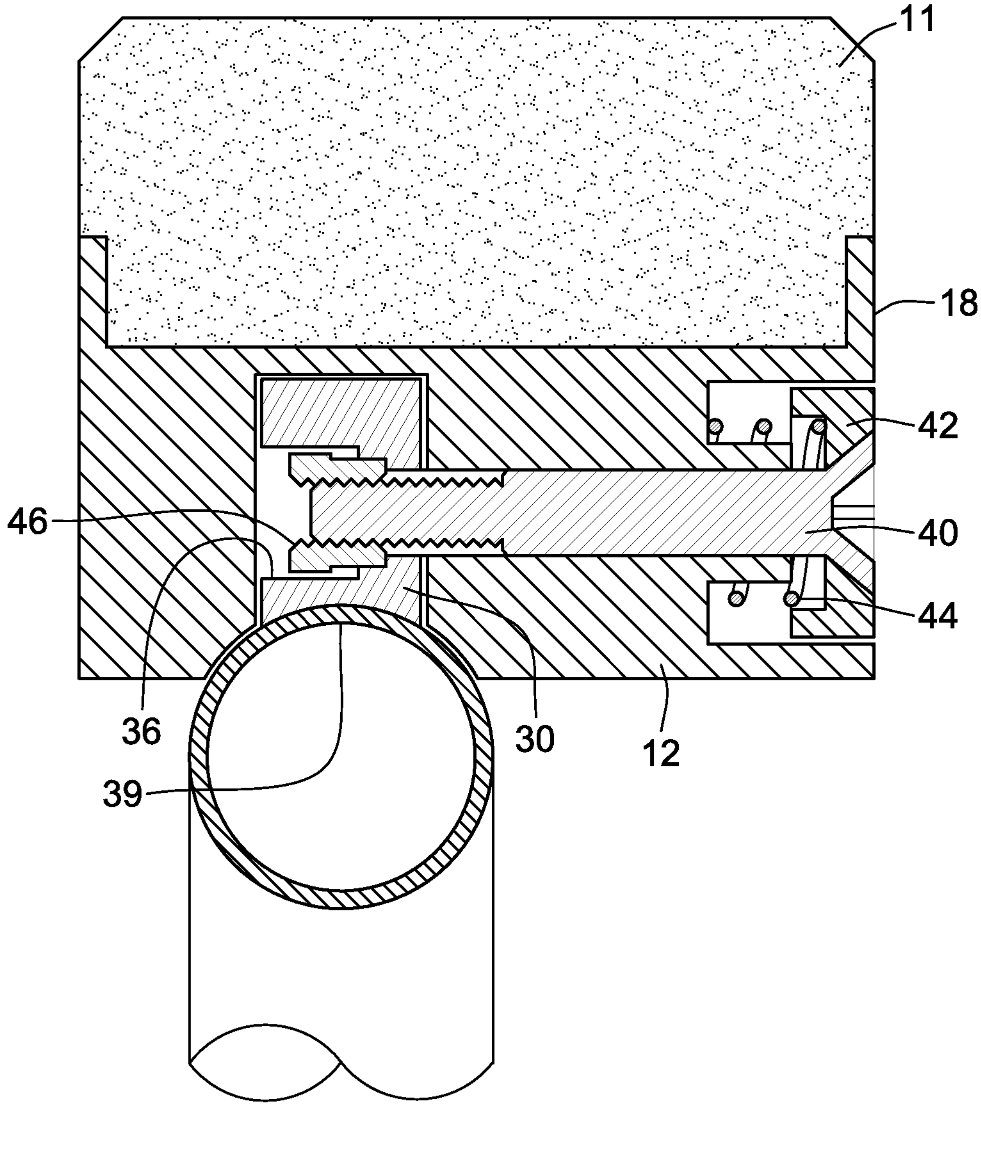
FIG. 3 is a cross-sectional view of the sliding arm mechanism according to one embodiment.

As shown in FIGS. 2 and 3, the slide rail 30 and the main portion 12 may be slidably coupled via a screw 40, such as a countersunk or other type of screw, a spacer 42 and a spring 44. Attached to the end portion of the screw 40 may be a nut 46, such as a square nut. To slidably couple the slide rail 30 and the main portion 12, the spacer 42 and the spring 44 are placed over the screw 40 such that they are adjacent the head of the screw 40. The end portion of the screw 40 extends through a hole 48 in the first opposing side area 18 of the main portion 12 and extends through the elongated aperture 35 of the slide rail 30. The nut 46 is placed on the threaded end portion of the screw 40, thereby holding the screw 40, spacer 42 and spring 44 in alignment. In some embodiments, the nut 46 may be adapted to fit within the track 36 of the slide rail 30. This configuration allows the main portion 12 and the slide rail 30 to be slidably coupled, while also allowing the main portion to move in a lateral motion in a direction parallel with the top part 39 of the arm of the wheelchair.

When the main portion 12 and slide rail 30 are slidably coupled, the head of the screw 40 may sit flush with, or a short distance from, the surface of the first opposing side area 18 when in operation (see FIG. 3). The spacer 42 may surround the head of the screw 40 and may also sit flush with, or a short distance from, the surface of the first opposing side area 18. The spring 44 allows the head of the screw 40 and the spacer 42 to be depressed, like a push button or similar actuating device, to move the screw 40 and spacer 42 a distance inward in the direction of the second opposing side area 20. When depressing the screw 40 and spacer 42, the nut 46 is adapted to slide along the track 36 from one end of the elongated aperture 35 to the other. In some embodiments, the opposing ends of the elongated aperture 35 include recessed portions 59, i.e., a recessed curve that resembles a "C," to allow a rounded portion of the nut 46 to engage the recessed portions. This allows the main portion 12 to move over the slide rail 30 in a lateral motion in a direction parallel with the top part 39 of the arm of the wheelchair and stop when the nut 46 reaches the recessed portions 59. By requiring that the user provide the necessary input—by pressing an actuating device, such as the screw 40 and spacer 42 combination described above—it ensures that the sliding arm mechanism 10 does not unintentionally move from one position to another. This provides for increased stability of the sliding arm mechanism 10, which is important for users when maneuvering in and out of the wheelchair.

The main portion 12 may additionally include pins 60 (shown in FIG. 2) positioned across the inner cavity 32 near opposing ends of the main portion 12. The ends of the slide rail 30 may include a notch 62 for receiving the pins 60 as the main portion 12 is moved laterally in a direction parallel with the top part 39 of the arm of the wheelchair. The pins 60 help to align the slide rail 30 when it reaches an end of the main portion 12. As shown in FIG. 2, two pins 60 are shown, but other number of pins 60 may be used. Alternatively, no pins may be used with the sliding arm mechanism 10. In addition to the slide rail 30 discussed above, it is contemplated that other types of sliding mechanisms may be used, such as telescoping tubes, that allow the arm to be adjusted to different lengths. These alternative embodiments are discussed in more detail below and shown in FIGS. 6-8.

FIGS. 4A and 4B illustrate an arm of the wheelchair with a cross-sectional view of the sliding arm mechanism 10. The arms in FIGS. 4A and 4B may be removable from or permanently attached to the wheelchair. In FIG. 4A, the sliding arm mechanism 10 is positioned in a full-length position such that the first opposing end area 22 of the main portion 12 is generally a distance A from a plane parallel with a front part 50 of the arm of the wheelchair. The front part 50 of the arm of the wheelchair is substantially perpendicular to the top part 39 of the arm of the wheelchair. In the full-length position, the distance A ranges from about 1 inch to about 4 inches, and more preferably from about 2 inches to about 3 inches. In the full-length position shown in FIG. 4A, the sliding arm mechanism 10 is positioned such that a user may rest substantially his or her entire forearm over the length of the arm pad 11. In this position, however, a user may have difficulty moving the wheelchair up to the front of a desk or table in order to access the top of the desk or table for certain purposes, such as to eat, write, work, etc. Thus, the arms of the wheelchair in the full-length position create obstacles for wheelchair users when the arms of the wheelchair are close to the height of the desk or table, i.e., the arm pad and the table top are contacting in such a way as to prevent the wheelchair from coming close enough to allow the user to access the table or desk. Such difficulties can be overcome by moving the main portion 12 to a second position, such as that shown in FIG. 4B.

In FIG. 4B, the sliding arm mechanism 10 is positioned in a desk-length position such that the first opposing end area 22 of the main portion 12 is generally a distance B from a plane parallel with the front part 50 of the arm of the wheelchair. In the desk-length position, the distance B ranges from about 5 inches to about 8 inches, and more preferably from about 6 inches to about 7 inches. Thus, in some embodiments, the difference in the distance between the full-length and the desk-length positions is about 4 inches.

In the desk-length position, the sliding arm mechanism 10, specifically the main portion 12, is moved in a lateral motion parallel to the arm of the wheelchair in a direction away from the front of the wheelchair. In this position, a smaller area of the arm pad 11 is available for a user to rest his or her forearm. In the desk-length position, a section of the main portion 12 may extend beyond the back portion of the wheelchair (see FIG. 1B). In some embodiments, the length of the section of the main portion that extends beyond the back portion of the wheelchair is from about 2 inches to about 5 inches.

Thus, in the second position as shown in the embodiment of FIG. 4B, the sliding arm mechanism 10 allows a user to adjust the arm of the wheelchair to allow the wheelchair to move in closer proximity to a desk or table. In this manner, the arm of the wheelchair does not hinder the user's ability to move close enough to access the top of the desk or table for certain purposes, such as to eat, write, work, etc. It should be noted that the lengths or distances described herein and shown in the respective drawings may vary with certain wheelchairs. However, it is contemplated that such variations fall within the scope of the claims and invention described herein.

Figure 5:
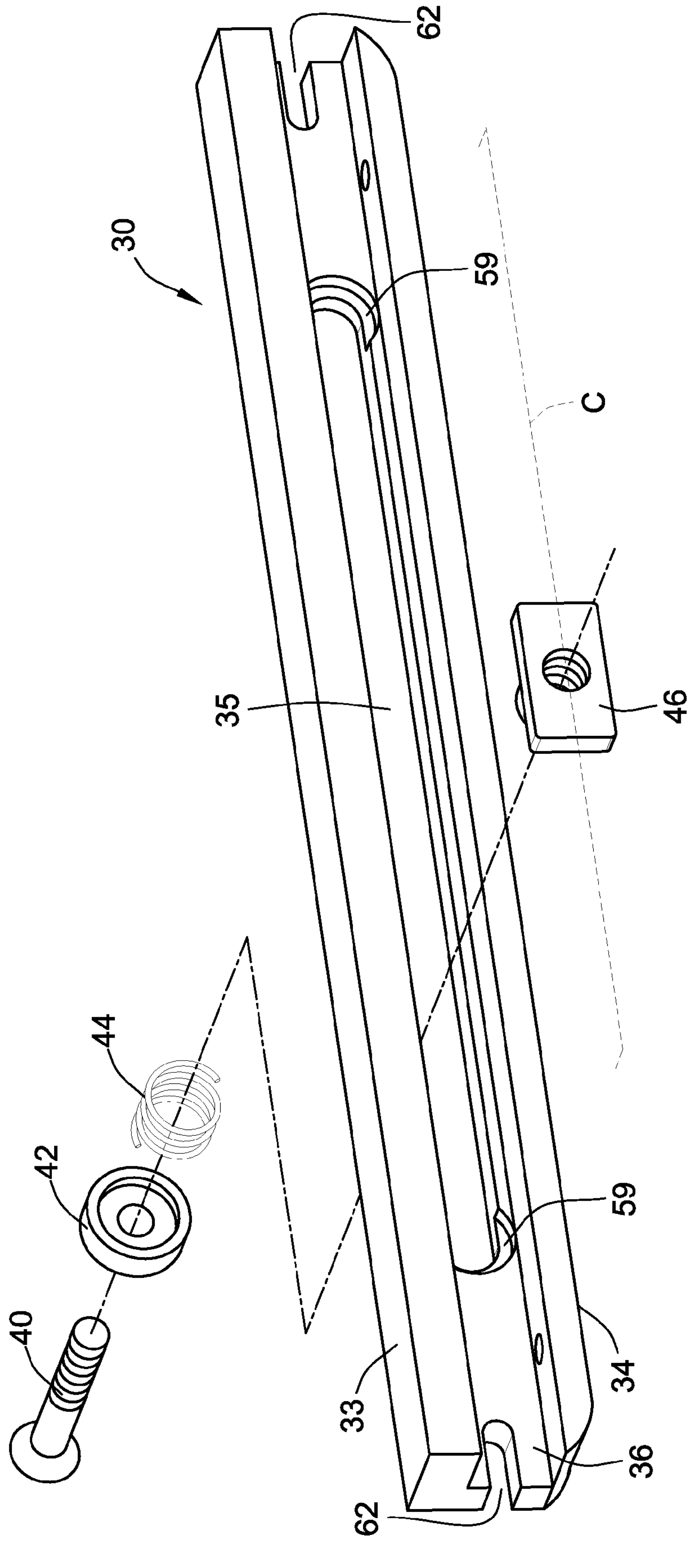
FIG. 5 is a side view of a slide rail according to one embodiment.

In FIG. 5, the slide rail 30 and track 36 are shown in more detail, as well as the relative position of the screw 40, spacer 42, spring 44 and nut 46. Once connected through the hole 48 in the first opposing side area 18 of the main portion 12 (see FIG. 2) and through the elongated aperture 35 of the slide rail 30, the screw 40, spacer 42, spring 44 and nut 46 slidably couple the main portion 12 and the slide rail 30 such that the main portion can move laterally a distance C in a direction parallel to the top part 39 of the arm of the wheelchair. In some embodiments, the notches 62 may receive the pins 60 (see FIGS. 2, 4A and 4B) as the main portion 12 is moved laterally between a full-length and desk-length position. In alternative embodiments discussed below, other sliding mechanisms may be used that provide adjustment between the full-length and desk-length positions.

Moreover, it is further contemplated that in addition to the full-length and desk-length positions described herein, the sliding arm mechanism 10 may be adjusted to several additional intermediate positions, i.e., half way between the full-length position and the desk-length position. One way this may be achieved is by including recessed areas or indentations (not shown) along the length of the elongated aperture 35 of the slide rail 30 (in addition to those recessed portions 59 at the ends of the elongated aperture 35) that allow for a portion of the nut 46, such as the rounded portion, to engage the recessed areas or indentations. Additionally, it is further contemplated that the present concepts may also allow for an entirely adjustable sliding arm mechanism 10 in which a user can select any position along the length of the slide rail 30. This may be accomplished, for example, by using a screw having a fitted nut which, when tightened, can be held in place. Thus, a user would have an infinite number of positions to be able to adjust the sliding arm mechanism 10. All of the embodiments described above and herein are consistent with the goals of providing improved wheelchair devices that allow users to access desks or tables and of allowing healthcare providers to reduce the number and types of wheelchairs, or wheelchair arms, that they must purchase and store at healthcare facilities.

Figure 6A:
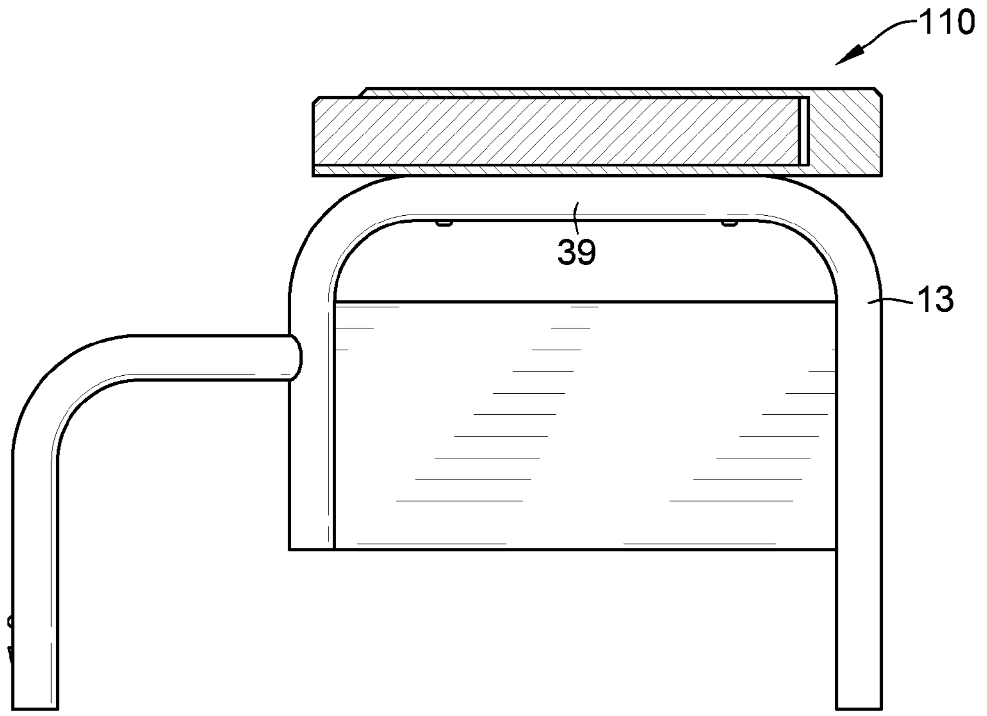
FIG. 6A is a side view of a sliding arm mechanism attached to an arm of a wheelchair in a desk-length position according to a further embodiment.
Figure 6B:
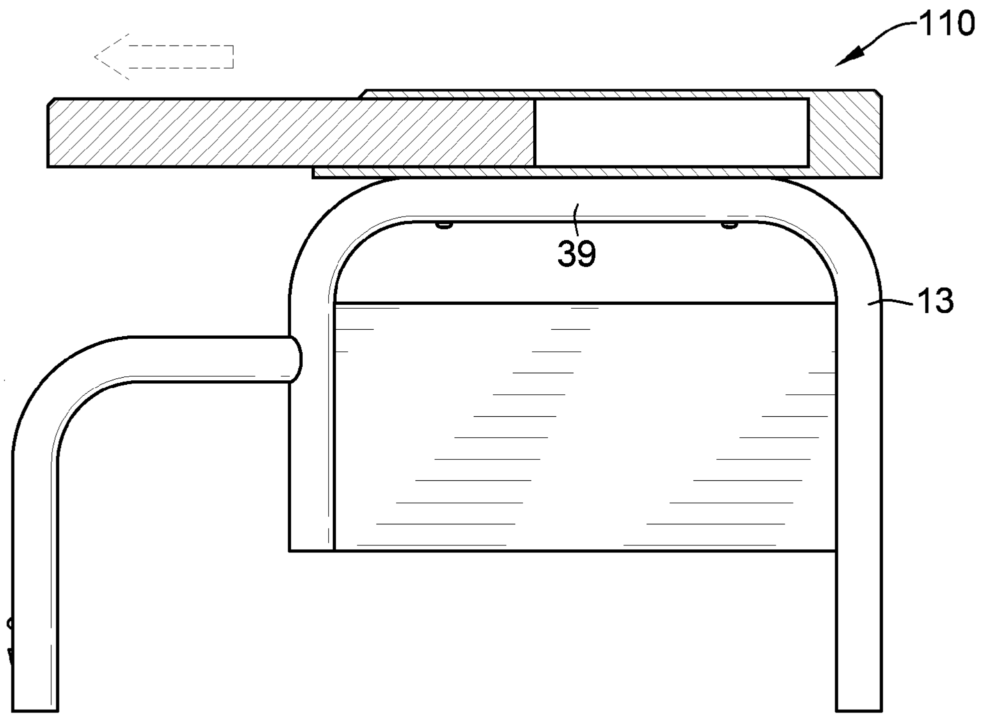
FIG. 6B is a side view of a sliding arm mechanism attached to an arm of a wheelchair in a full-length position according to another embodiment.
Figure 7A:
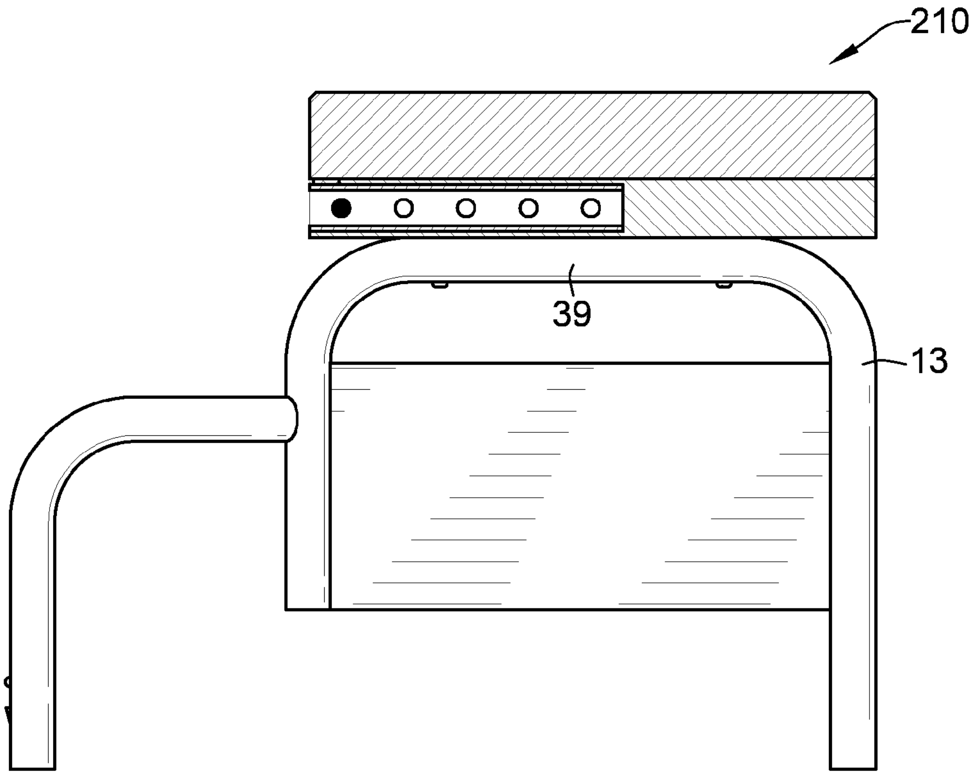
FIG. 7A is a side view of a sliding arm mechanism attached to an arm of a wheelchair in a desk-length position according to a further embodiment.
Figure 7B:
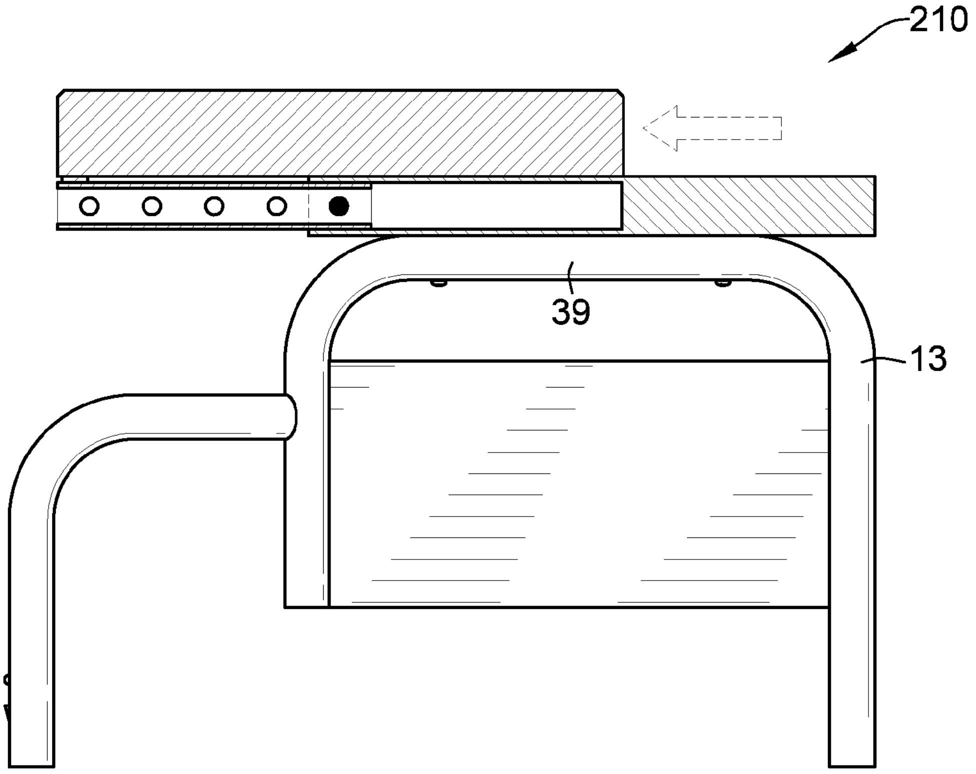
FIG. 7B is a side view of a sliding arm mechanism attached to an arm of a wheelchair in a full-length position according to another embodiment.

In addition to the embodiments described above in FIGS. 1-5, other embodiments may provide the same advantages and achieve the same goals by providing improved wheelchair devices, particularly improved arm rest devices. For example, in FIGS. 6A and 6B, an alternative embodiment of a sliding arm mechanism 110 is shown wherein the arm pad is a telescoping arm pad attached to the top part 39 of the arm 13 of the wheelchair. In this embodiment, a telescoping portion of the arm pad moves in and out of a stationary portion, thereby shortening the arm pad to a desk-length position (as shown in FIG. 6A) and extending the arm pad to a full-length position (as shown in FIG. 6B). When in the full-length position, the telescoped portion is in alignment with the stationary portion of the arm pad. In FIGS. 7A and 7B, another alternative embodiment is shown where a sliding arm mechanism 210 is attached to the top part 39 of the arm 13 of the wheelchair. The sliding arm mechanism 210 includes a telescoping tube mechanism having an outer tube and an inner tube. The outer tube is attached to the top part 39 of the arm 13; the inner tube is attached to the arm pad. The arm pad is allowed to be adjusted by pressing a push button that releases the inner tube and moves the arm pad from a desk-length position (as shown in FIG. 7A) to a full-length position (as shown in FIG. 7B). The inner tube has a plurality of holes for accepting the push button, which allows the user to also move the arm pad to various intermediate positions.

Figure 8:
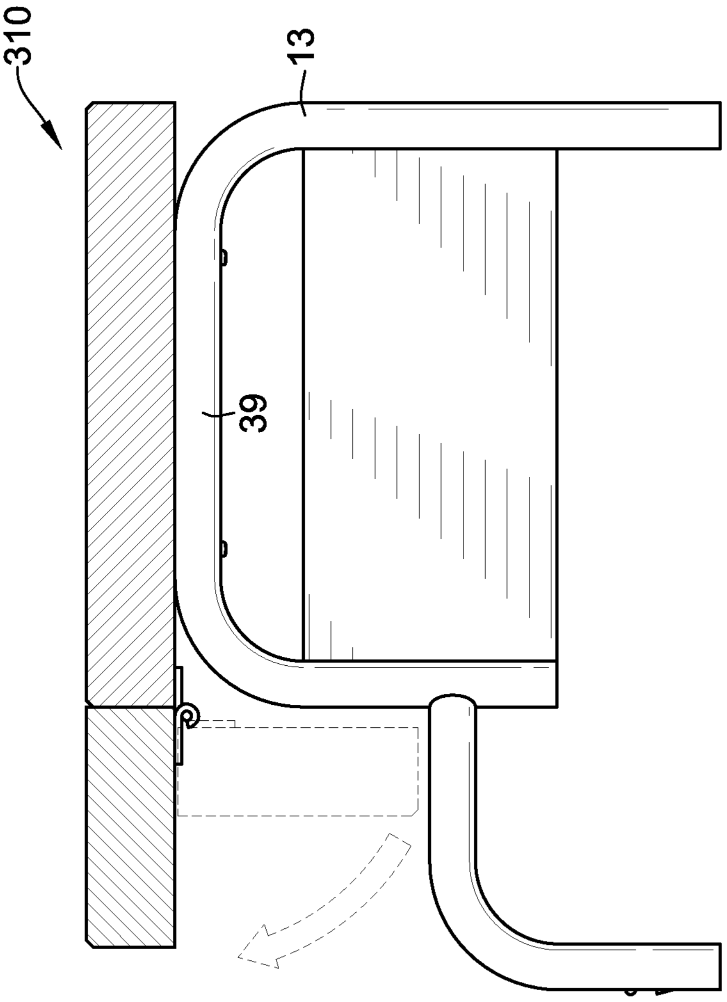
FIG. 8 is a side view of an adjustable arm pad attached to an arm of a wheelchair according to a further embodiment.

Additionally, a further embodiment is shown in FIG. 8, which illustrates a side view of an adjustable arm pad 310 attached to the top part 39 of the arm 13 of a wheelchair. The adjustable arm pad 310 includes a stationary portion and an adjustable portion. The adjustable portion may be flipped downward, via a hinge or similar device. The hinge is attached to the bottom side of the arm pad and allows the adjustable portion to be flipped down to provide a desk-length arm pad. The portion of the arm pad that is flipped down rests in a position perpendicular to the top part 39 of the arm 13. When a full-length arm pad is desired, the portion is then flipped up and secured in alignment with the stationary portion of the arm pad. Each of the embodiments described herein, which include a sliding arm mechanism or an adjustable arm pad, may be used with removable wheelchair arms or arms that are permanently attached to a wheelchair. Moreover, each of the embodiments offer improvements for adjustable arm pads that provide increased accessibility to desks or tables.

While the best modes for carrying out the present invention have been described in detail, those familiar with the art to which this invention relates will recognize various alternative designs and embodiments for practicing the invention within the scope of the appended claims.

What is claimed is:

1. A sliding arm mechanism for attaching to an arm of a wheelchair, the sliding arm mechanism comprising:

a main portion comprised of a single integrated unit having a top area, a bottom area, first and second opposing end areas, first and second opposing side areas and an inner cavity, the top area having a generally rectangular surface for receiving an arm pad;

a slide rail adapted to be housed within the inner cavity of the main portion, the slide rail comprising a top side, a bottom side and an elongated aperture located between the top side and the bottom side, the bottom side of the slide rail being coupled to a top part of the arm of the wheelchair;

at least two pins positioned transversely across opposing ends of the inner cavity of the main portion; and wherein the slide rail and the main portion are slidably coupled to allow the main portion to move laterally over the slide rail in a direction parallel to the top part of the arm of the wheelchair, the main portion moving between a first position and a second position while the slide rail is non-moving relative to the arm of the wheelchair.

2. The sliding arm mechanism of claim 1, wherein the slide rail and the main portion are slidably coupled via at least one nut, a screw and a spring.

3. The sliding arm mechanism of claim 2, wherein the screw is a countersunk screw.

4. The sliding arm mechanism of claim 1, wherein the movement of the main portion between the first position and the second position results in the main portion being moved a distance from a front part of the arm of the wheelchair.

5. The sliding arm mechanism of claim 4, wherein in the first position, the distance between the first opposing end area of the main portion and the front part of the arm of the wheelchair is approximately 1 to approximately 4 inches, and in the second position, the distance between the first opposing end area of the main portion and the front part of the arm of the wheelchair is approximately 5 to approximately 8 inches.

6. The sliding arm mechanism of claim 4, wherein in the first position, the distance between the first opposing end area of the main portion and the front part of the arm of the wheelchair is approximately 2 to approximately 3 inches, and in the second position, the distance between the first opposing end area of the main portion and the front part of the arm of the wheelchair is approximately 6 to approximately 7 inches.

7. The sliding arm mechanism of claim 1, wherein the second position allows the wheelchair to be positioned in closer proximity to a desk or table than the first position.

8. The sliding arm mechanism of claim 1, further comprising an arm pad cover for covering at least the top area of the main portion.

* * * * *